United States Patent
Baker

(10) Patent No.: US 8,176,842 B2
(45) Date of Patent: May 15, 2012

(54) BAKING PAN

(75) Inventor: Mario John Chaves Baker, New Territories (CN)

(73) Assignee: Lico (HK) Manufacturing Ltd., Shatin, New Territories, Hong Kong (CN)

( * ) Notice: Subject to any disclaimer, the term of this patent is extended or adjusted under 35 U.S.C. 154(b) by 1084 days.

(21) Appl. No.: 12/009,058

(22) Filed: Jan. 16, 2008

(65) Prior Publication Data

US 2008/0173187 A1    Jul. 24, 2008

(30) Foreign Application Priority Data

Jan. 24, 2007 (AU) ................................ 2007900348

(51) Int. Cl.
*A47J 37/10* (2006.01)
*A22C 7/00* (2006.01)

(52) U.S. Cl. ............................................ 99/422; 99/426

(58) Field of Classification Search .................... 99/422, 99/423, 443, 426, 427, 449

See application file for complete search history.

(56) References Cited

U.S. PATENT DOCUMENTS

| | | | | |
|---|---|---|---|---|
| 428,792 | A * | 5/1890 | Willey | 249/172 |
| 3,580,484 | A * | 5/1971 | Schneider | 220/574 |
| 6,439,110 | B1 * | 8/2002 | Lin | 99/425 |
| 6,684,760 | B1 * | 2/2004 | Rajusth | 99/449 |
| 7,766,184 | B2 * | 8/2010 | Avery et al. | 220/573.1 |
| 2002/0092428 | A1 * | 7/2002 | Cartossi | 99/422 |
| 2007/0080163 | A1 * | 4/2007 | Yeung | 220/675 |
| 2007/0169636 | A1 * | 7/2007 | Carlson et al. | 99/279 |
| 2007/0284505 | A1 * | 12/2007 | Kaposi | 249/144 |
| 2008/0060530 | A1 * | 3/2008 | Tetreault et al. | 99/355 |
| 2010/0133142 | A1 * | 6/2010 | Avery et al. | 206/557 |
| 2011/0068110 | A1 * | 3/2011 | Weld et al. | 220/573.1 |

* cited by examiner

*Primary Examiner* — Stephen L. Blau
(74) *Attorney, Agent, or Firm* — Alix, Yale & Ristas, LLP

(57) ABSTRACT

The baking pan which may have various forms has a substantially metal base and a substantially metal side wall connected by a flexible loop. The base comprises first and second metal segments that are connected by a flexible strap-like band. One edge of the band is connected to an edge of the first metal segment and a second edge of the band is connected to an edge of the second metal segment. Both ends of the strap-like band are connected to the first edge of the loop. The band can flex along its length to allow the metal segments to move with respect to each other to aid in the detachment of baked food from the base.

19 Claims, 8 Drawing Sheets

BAKING PAN

TECHNICAL FIELD

The application concerns kitchen baking ware and, in particular, a baking pan for baking foods such as cakes, breads and slices. The application also concerns a method for making a baking pan.

BACKGROUND ART

Traditionally, metal baking pans are used for baking foods, such as cakes, breads or slices. Once the food is baked it is often difficult to remove the food from the pan as the food becomes somewhat attached to the pan during baking.

SUMMARY

A baking pan for baking food comprises a substantially metal base and a substantially metal side wall, wherein the base and wall are continuously connected by a flexible strap-like loop whereby a first edge of the loop is continuously connected to the base and a second edge of the loop is continuously connected to the wall.

It is an advantage that the loop is flexible so as to allow sufficient movement between the base and wall to help detach the baked food from the baking pan. The side wall may move substantially vertically and perpendicularly to the base. The side wall may move in a circular movement. The side wall may move closer to the base.

The flexible loop may be a unitary loop. The flexible loop may be comprised of flexible materials such as silicone. The flexible loop may include other flexible materials such as thin strips of flexible metal.

The flexible loop may connect with the base and/or side wall by overlapping with the base or side wall. The cross section of the strap-like loop may be curved. The first edge of the loop where it overlaps the base may be substantially parallel with the base. The first edge of the loop may be attached to an edge of the base. The second edge of the loop where it overlaps with the wall may be substantially parallel with the side wall. The second edge of the loop may be attached to a bottom edge of the wall.

The base may comprise a first and second metal segments that are connected by a flexible strap-like band. A first edge of the band may be connected to an edge of the first metal segment and a second edge of the band may be connected to an edge of the second metal segment. Both ends of strap-like band may be connected to the first edge of the loop. It is an advantage of the band that it can flex along its length to allow the metal segments to move with respect to each other to help detach the baked food from the base.

The loop and band may be unitary. The strap-like band may extend substantially the length or width of the base.

Alternatively, the base may comprise a first and second metal segments that are connected by a further flexible strap-like loop wherein this further loop shares substantially the same center with the loop and encloses the first metal segment. The second metal segment may enclose the further loop. It is an advantage that the band can flex along its length to allow the metal segments to move with respect to each other to help detach the baked food from the base.

The loop may be provided with a plurality of feet formations arranged under the base. In is an advantage of this embodiment that in use the baking pan rests on the feet formations.

In a further aspect, a baking pan is comprised of multiple baking pans as described above and that are connected.

In one embodiment, a further advantage is that the loop may flex to allow the wall to move parallel to the base to help detach the baked food from the base.

A further aspect includes a method of making a baking pan as described above.

BRIEF DESCRIPTION OF THE DRAWINGS

Embodiments will now be described with reference to the accompanying drawings in which:

FIGS. 8(*a*) and 8(*b*) respectively show simplified cross-sectional views of a second and third example of a baking pan;

DETAILED DESCRIPTION

Figure 1:
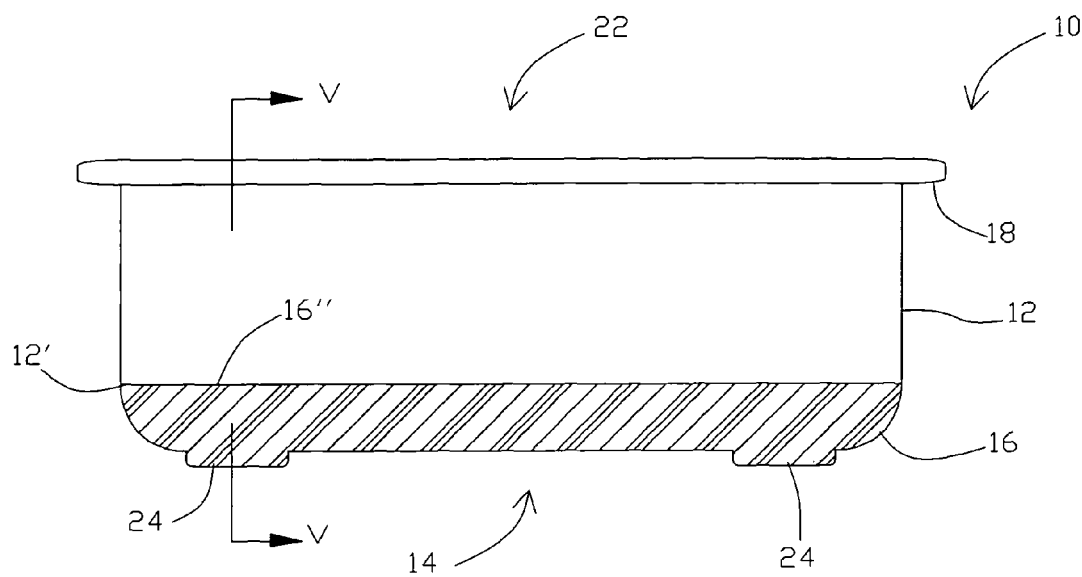
FIG. 1 is a simplified side view of a first rectangular baking pan.

An example baking pan 10 is shown in FIG. 1 and is comprised of a metal side wall 12 that surrounds a substantially metal rectangular-shaped base 14. In this example, the side wall 12 has a vertical height of 53 mm and forms a rectangular shape having the dimensions of 300 mm×130 mm. The upper edge of the side wall 12 is formed with a lip 18 for easy handling of the pan 10. As shown in the top view of FIG. 2, the base 14 is comprised of two substantially rectangular shaped metal segments 14' and 14".

The side wall 12 is continuously connected to the base 14 by a flexible silicone loop 16. The loop 16 is strap-like in shape having a length that is substantially equal to the perimeter of the base, a thickness substantially equal the thickness of the side wall and base, and a width greater than the thickness of the loop. The loop 16 surrounds both base segments 14' and 14". The inner edge 16' of the silicone loop 16 is continuously connected to the outer edge of the base 14 (in this case the combined outer edge of segments 14' and 14") and the outer edge 16" of the silicone loop 16 is continuously connected to the bottom edge 12" of the side wall 12. The connections are water tight to create a sealed cavity 22 of the baking pan 10. This silicone loop 16 is flexible and its function will be discussed in more detail below.

In this example, the base segments 14' and 14" are held in position by a silicone band 20 that is also strap-like in shape. One edge of the band 20 extends the length of the segment 14' and the opposite edge of the band 20 extends the length of the segment 14". The band 20 extends the length of the segments 14' and 14" and each end is connected to the inner edge 16' of the loop 16. This band 20 is unitary with the loop 16 so as to form a figure-eight shape. This band 20 is also flexible and will be discussed in more detail below.

The silicone loop 16 includes feet 24 also made from silicone and the pan 10 rests on these feet 24. In use, this has the advantage that the silicone touches the work surface rather than the metal base which prevents scratching and provides a better grip of the work surface.

Figure 3:
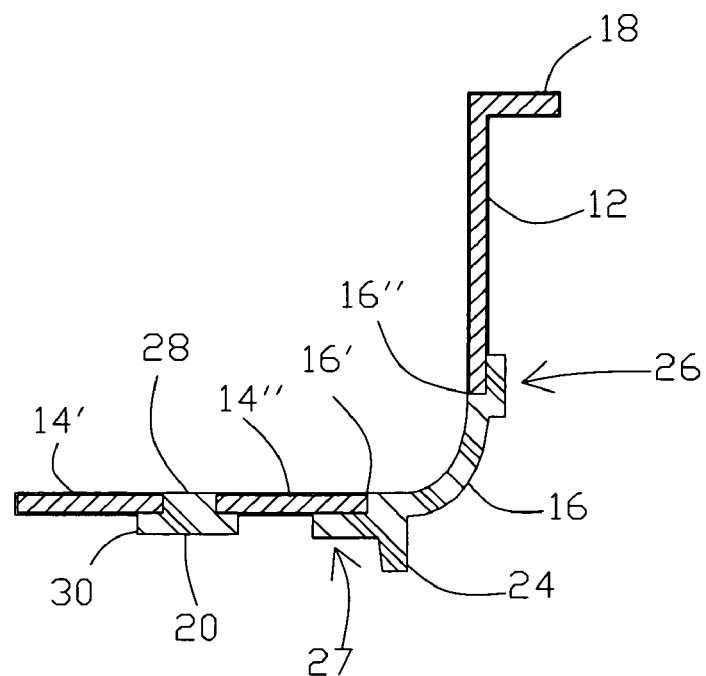
FIG. 3 is a simplified cross-sectional enlarged view of the corner of the first rectangular baking pan.

A cross-section of the loop 16 is shown in FIG. 3. So as to better show the shape of the loop 16 this drawing is not to scale and is simplified. The loop 16 overlaps with the side wall 12 and base 14 as shown at 26 and 27 respectively. This ensures a better seal between the metal parts 12 and 14 of the pan 10 and the loop 16. The loop 16 has a curved cross-section to span between the base 14 and the side wall 12 which are substantially perpendicular. In this way the outer edge 16" of the silicone loop 16 is aligned with the side wall 12 and the part that overlaps 26 with the side wall 12 is substantially parallel with the side wall 12. Further the inner edge 16' of the silicone loop 16 is aligned with the base 14" and the part that overlaps 27 with the base 14" is substantially parallel with the base 14".

FIG. 3 also shows the silicone band 20 that has an upside T cross section. The base of the T 28 spans the distance between the two base segments 14' and 14" and the top portion 30 of the T spans the distance between the two base segments 14' and 14" and extends further to overlap and be parallel with the base segments 14' and 14". Again, this overlapping ensures better connection and sealing.

An example of how this baking pan 10 can be manufactured will now be described. The pan 10 is stamped out from sheet metal in a metal press to form a unitary metal baking pan. Cuts are made into the pan 10 so as to form the separate metal parts of the pan that will be held together by the silicone. In this example the cuts include a cut to separate the base 14 from the side wall, and further cuts into the base 14 to form base segments 14' and 14". Each of the metal parts 12, 14' and 14" are then coated with a non stick coating.

The edges of the metal parts 12, 14' and 14" that will be connected to the silicone are masked out so that there is a bare metal surface exposed at those edges. Glue is then applied to the masked edges. Then at least the glued edges of the metal parts are placed into an insert mold and the silicone is either injected or compressed into the mold. The pan 10 is now finished and ready for packing.

Figure 4:
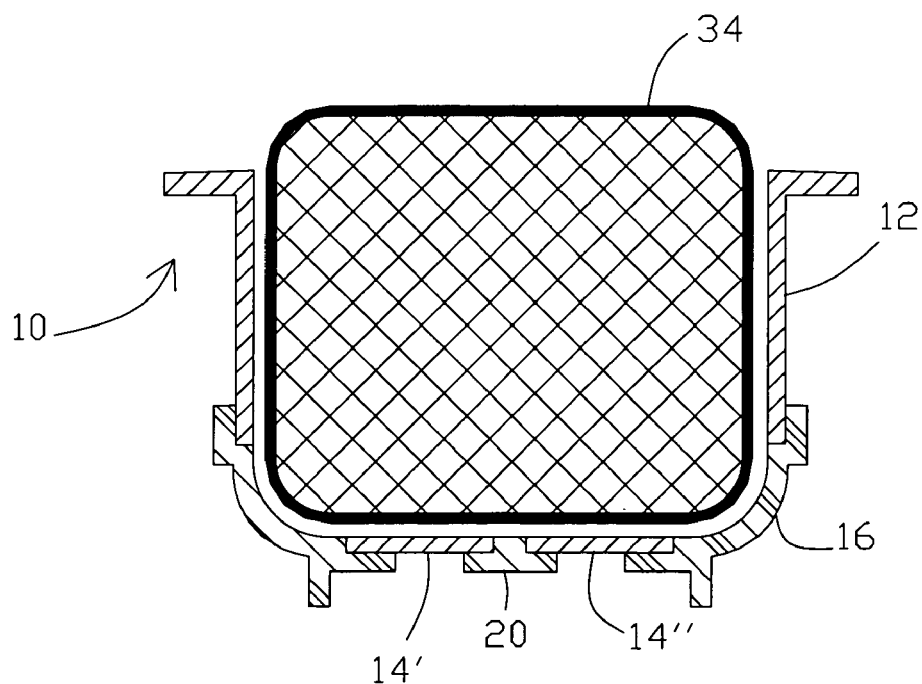
FIG. 4 is a simplified cross-sectional view of the first rectangular baking pan during baking of a cake along line V shown in FIG. 1.
Figure 5:
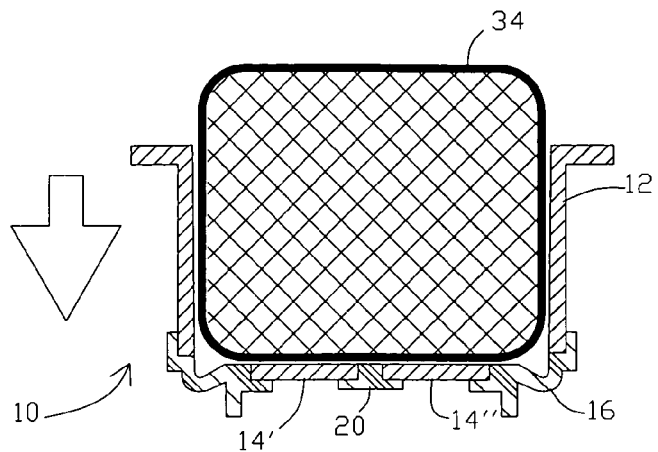
FIG. 5 shows a first movement to detach the cake from the first rectangular baking pan of FIG. 4.

An example of using the baking pan 10 will now be described with reference to FIGS. 4 to 6. Again, these Figs are simplified and not to scale so as to better show the flexibility of the silicone 16 and 20 during use of the pan 10. In this example the batter of the cake to be baked is poured into the cavity 22 of the baking pan 10. Since the cavity 22 is sealed at the bottom by the connection of the side wall 12 and base 14 to the silicone 16 and 20 the batter is contained within the baking pan 10 without any leaking. The batter is spread around the pan 10 so that it fills the entire base 14 of the pan 10.

The pan 10 is then placed in the oven. As can be seen from FIG. 4, the cake 34 rises and during the baking, the cake 34 becomes somewhat attached to the pan 10.

Once the cake 34 is baked, it is removed from the oven. FIG. 5 shows a first movement that will help remove the cake 34 from the pan 10. The side wall 12 can be pushed down to bring it closer to the base 14 so that the side wall 12 moves in a vertical downward direction. The silicone loop 16 flexes to allow this movement. The curved cross-section of the silicone loop 16 is bent more sharply so that part of the cross section begins to flatten out as shown in FIG. 5 and extends downward. As the side wall 12 moves downward, the cake 34 becomes detached from the side wall 12 since the side wall 12 moves independently of the cake 34. Depending on the firmness of the cake 34, this movement can be small and repeated multiple times to ensure successful detachment. The same movement shown in FIG. 5 could be achieved by applying upward pressure to the entire base 14 of the pan 10.

Figure 2:
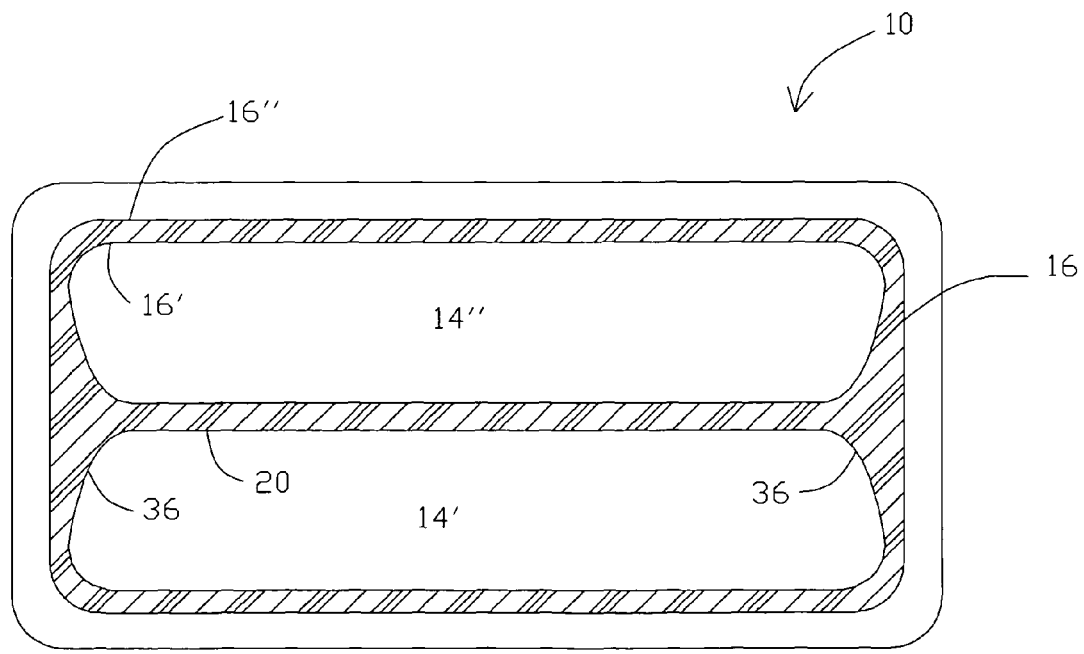
FIG. 2 is simplified top view of the first rectangular baking pan.
Figure 6:
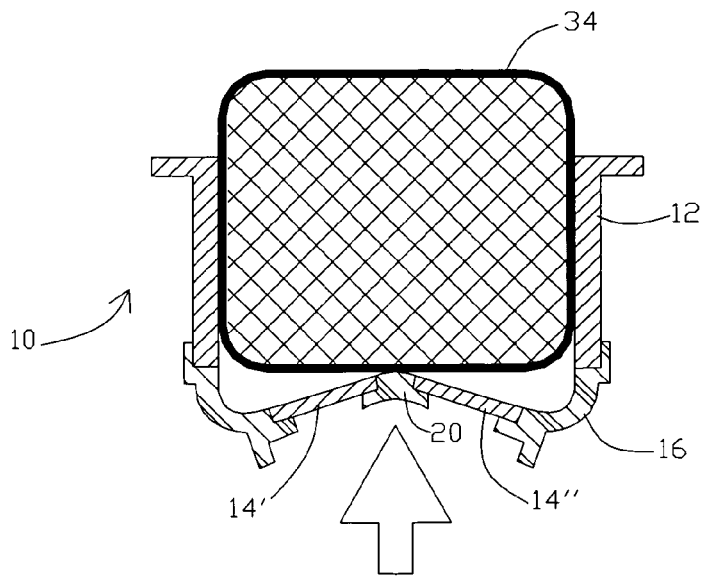
FIG. 6 shows a second movement to detach the cake from the first rectangular baking pan of FIG. 4.

To help the cake 34 detach from the base 14 of the pan 10 the movement shown in FIG. 6 can be used. Here, pressure can be applied to the silicone band 20 to cause the base 14 to fold along the length of the band 20. As a result the base segments 14' and 14" and the band 20 form an inverted V with the silicone band 20 moving into the cavity 22. Depending on the food being baked, this may determine the angle that is defined by the inverted V. In this example of a cake 34 that may be sponge, the angle defined by the V must be large as the sponge has a greater attachment (i.e. stickiness) to the pan 10 than other bakable items. As best seen in FIG. 2, the surface areas of the base 14 marked 36 includes more silicone to allow for this flexibility. The base segments 14' and 14" are rounded off at the corners in this area 36 to allow for the extra silicone. As a result of this movement, the cake 34 is lifted from the metal base segments 14' and 14" and is in part detached from the base 14 of the pan 10. This movement can be small and repeated multiple times to allow the cake 34 to detach from the base 14 without damaging the cake 34.

Figure 7:
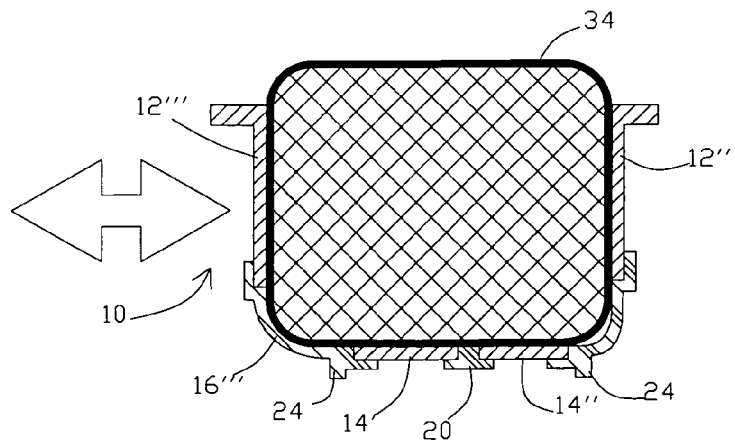
FIG. 7 shows a third movement to detach the cake from the first rectangular baking pan of FIG. 4.

The movement shown in FIG. 7 can be used to help the cake 34 detach from the base 14 or can be used in addition to the movement shown in FIG. 6. The pan 10 is placed on the work surface with the feet 24 gripping the work surface so that a lateral pressure can be applied to one part of the side wall 12, in this case end 12". Side wall 12" is pushed so that it moves to the center of the base 14. This results a movement of the cake 34 towards the opposite part of the side wall 12'''. In response, this part of the side wall 12''' moves further away from the base 14 to accommodate the cake 34 and the adjacent part of the silicone loop is expanded as shown in FIG. 7. This movement can be repeated in reverse, with the pressure applied to the side wall 12''' which results in the side wall 12''' moving closer to the centre of the base 14. Both movements cause the cake 34 to slide along the base 14 and become detached from the base 14. Again, these movements can be small and repeated multiple times to allow the cake to 34 to detach from the pan 10 without damaging the cake.

Now that both the sides and base of the cake 34 are no longer attached to the pan 10 the cake 34 can easily be removed by inverting the pan 10 and allowing the cake 34 to fall to the work surface.

Figure 8:
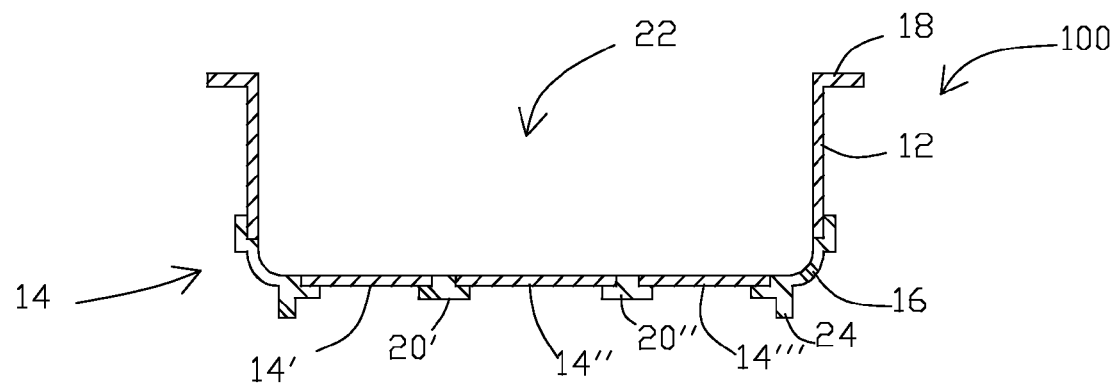
FIG. 8 shows a simplified cross-sectional view of a second example of a baking pan.

A second example of a baking pan 100 will now be described with reference to FIG. 8. In this second example, further silicone bands 20' and 20" are provided substantially equally spaced in the base 14 of the pan 100. This results in the loop 16 being unitary with both bands 20' and 20" to form a three adjacent looped shape. Each band 20' and 20" can be used essentially independently as part of the movement described with reference to FIG. 6 so as to form an inverted V. Alternatively, the silicone bands 20' and 20" could work simultaneously in co-operation by applying different upwards pressure to the base 14. For example, upward pressure could be applied to metal segments 14' and 14'" to cause the silicone bands 20' and 20" to move into the cavity 22 and the metal segment 14" also moving into the cavity 22 but remaining flat, while the segments 14' and 14" are angled. Again, a small amount of pressure can be applied to the base 14 multiple times to help the cake become detached from the base 14.

Figure 9:
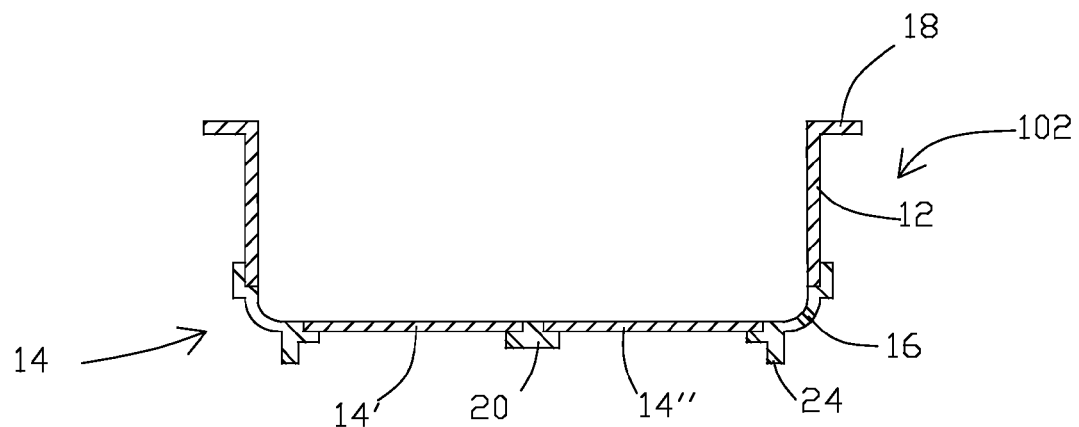
FIG. 9 shows a simplified cross-sectional view of a third example of a baking pan.

A third example of the baking pan 102 shown in FIG. 9 is for a larger sized pan and the metal segments 14' and 14" are simply larger.

Figures 10, 11:
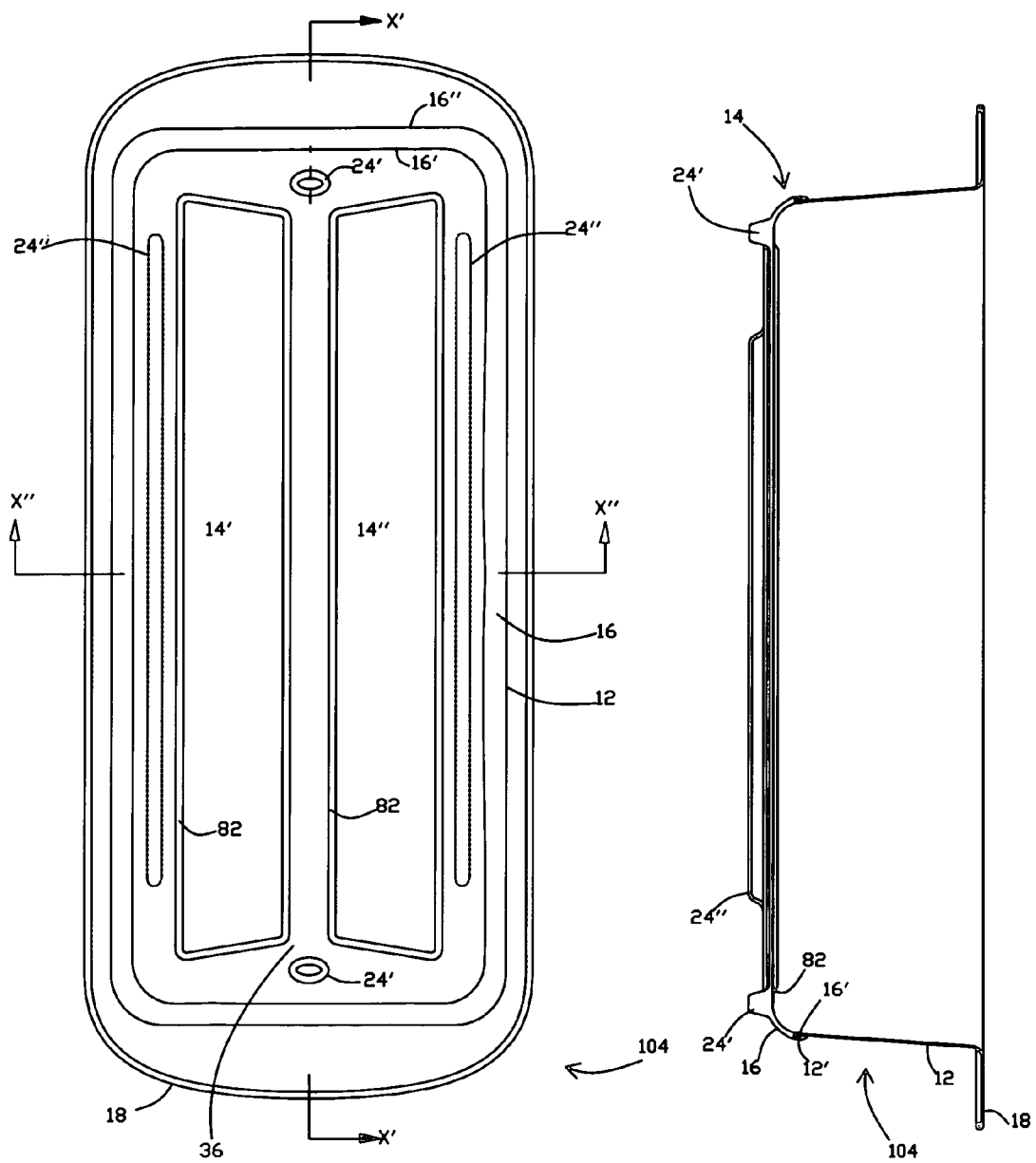
FIG. 10 is a more detailed top view of a third rectangular baking pan.
FIG. 11 is a more detailed cross sectional view of the third rectangular baking pan along line X' shown in FIG. 10.

A further fourth example of the baking pan 104 will now be described with reference to FIGS. 10, 11 and 12. These Figs. show more detail about the design of the baking pan 104. The same reference numerals used to describe the first example of the baking pan 10 are used again in this example.

Figure 12:
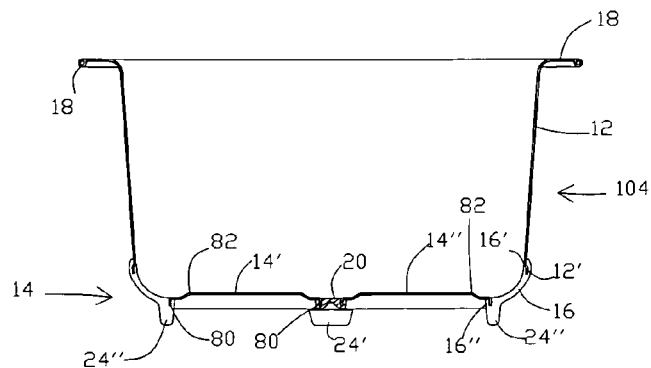
FIG. 12 is a more detailed cross sectional view of the third rectangular baking pan along line X" shown in FIG. 10.

The connection between the side wall 12 and base 14 to the loop 16 is best shown in FIG. 12. The outer edge 16' of the silicon loop 16 overlaps with the lower end 12' of the side wall 12 both in the inner side and outer side of the side wall 12. The end 12' of the side wall is angled slightly towards the outer side of the side wall 12. This arrangement provides a better seal and connection between the side wall 12 and the loop 16.

A similar arrangement is provided between the edge of the base segments 14' and 14" and the loop 16. Referring to base segment 14', the edge 80 of the base segment 14' is angled substantially vertically and perpendicularly from the surface of the base segment 14. The portion of the edge 80 that connects with the loop 60 is enclosed by silicon of the loop 16. The portion of the edge 80 that connects to the band 20 is also surrounded by silicon of the band 20.

To assist the movement shown in FIG. 6, the band 20 is shaped as shown in FIG. 12. The upper surface of the band 20 is substantially flat and parallel with the base 14. The under side has an inverted V shaped into it. When the band 20 is bent along its length as shown in FIG. 6, the removed inverted V promotes easier bending along the length of the band 20 allowing for a slightly greater degree of bend if required.

As can be seen from FIG. 12, the shape of the base segments 14' and 14" need not be flat. In this example, the base segments 14' and 14" are bent along line 82 so that the area of the segments 14' and 14" within lines 82 are positioned slightly higher than the area of the segments 14' and 14" outside the lines 82.

This fourth example of the baking pan 104 also provides further feet 24 than that described with reference to the first example. In this example, feet 24' are provided at each end of the pan 104 and aligned between the segments 14' and 14" as indicated by the dashed line 24' of FIG. 10. Further pair of feet 24" are positioned as indicated by the dashed lines 24" and extend most of the length of the base segments 14' and 14'".

Figures 13, 14:
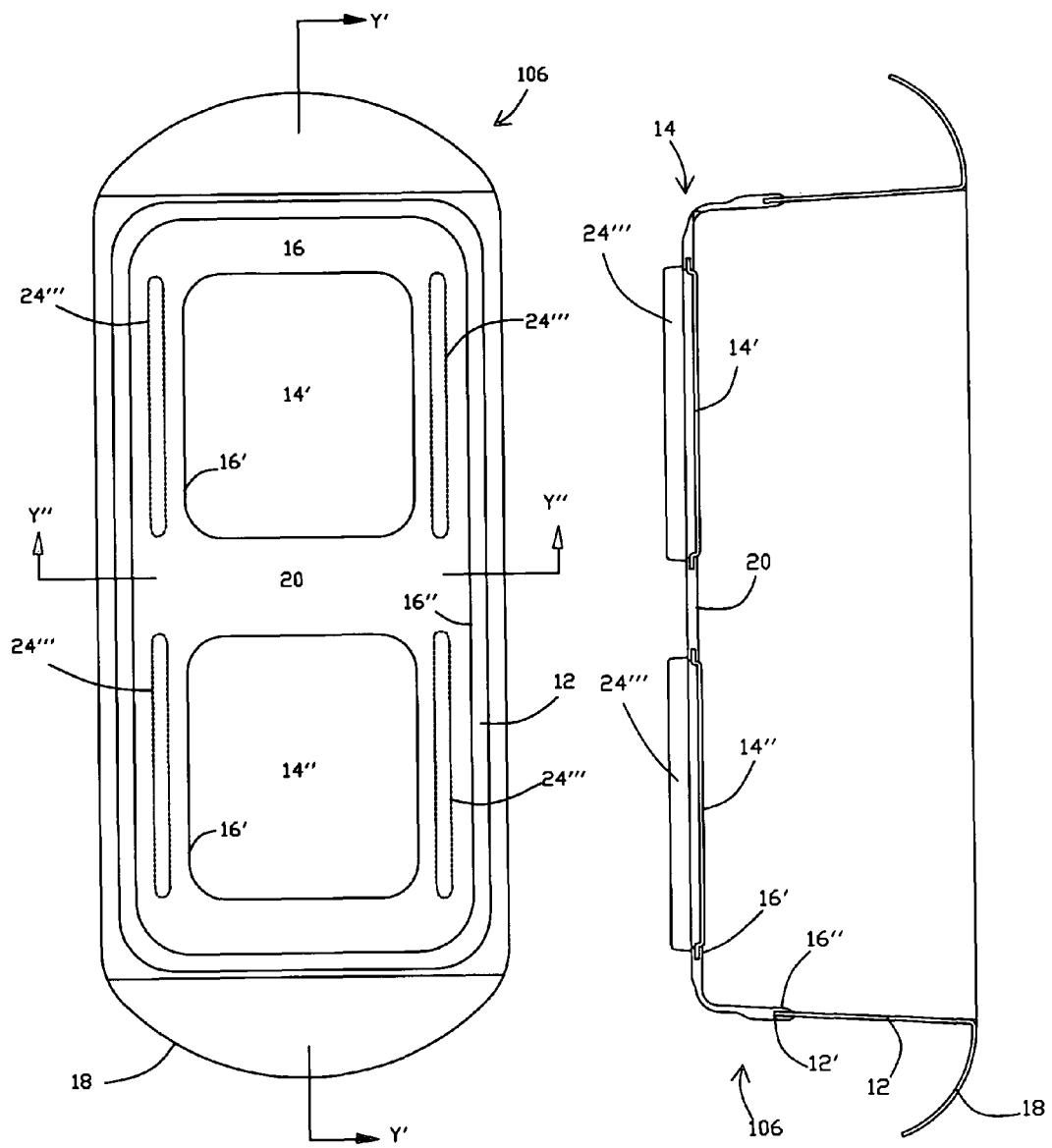
FIG. 13 is a more detailed top view of a fourth rectangular baking pan.
FIG. 14 is a more detailed cross sectional view of the fourth rectangular baking pan along line Y' shown in FIG. 13.
Figure 15:
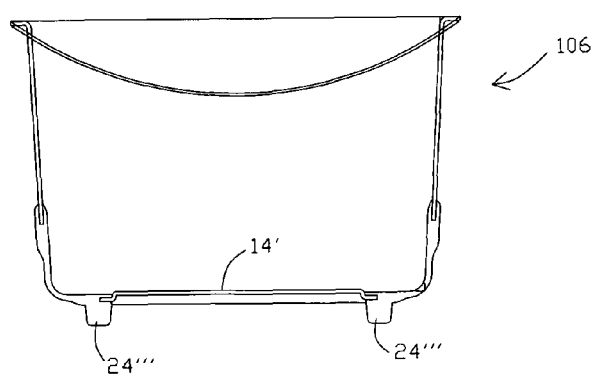
FIG. 15 is a more detailed cross sectional view of the fourth rectangular baking pan along line Y" shown in FIG. 13.

A fifth example of the baking pan 106 is shown in FIGS. 13, 14 and 15. Again, like reference numerals have been used to represent features previously described in relation to previous examples. The main difference with this fifth example is the shape of the base segments 14' and 14" which are square in shape with rounded corners. To accommodate this shape, the band 20 extends the width of the baking pan 106 (rather than the length of the pan 10 as shown in FIG. 2).

Further, this baking pan 106 provides a different feet design. Feet 24'" are provided on sides of the square segments 14' and 14" at positions indicated by the dashed lines 24'" of FIG. 13.

Figure 16:
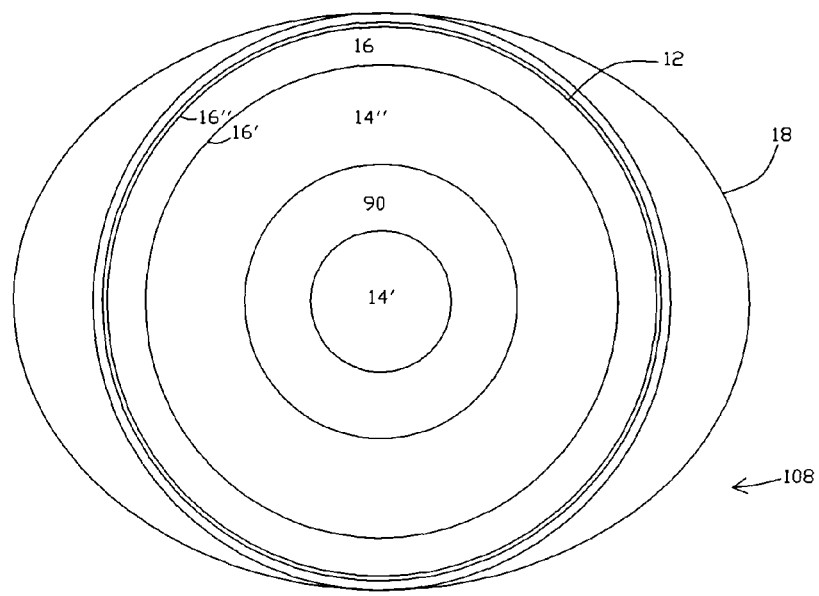
FIG. 16 is a more detailed top view of a circular baking pan.
Figure 17:
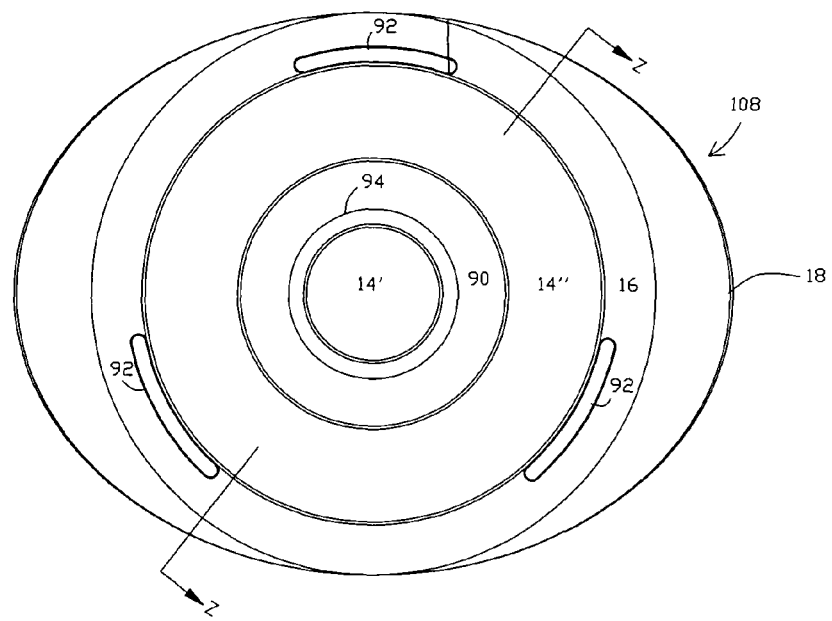
FIG. 17 is a simplified bottom view of the of the circular baking pan.
Figure 18:
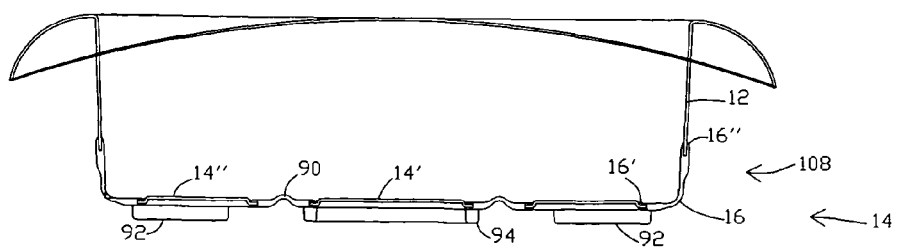
FIG. 18 is a more detailed cross sectional view of the circular baking pan along line Z shown in FIG. 17.

An example of a circular baking pan 108 is shown in FIGS. 16, 17 and 18. Again, like reference numerals have been used to represent features previously described in relation to previous examples. Again the base 14 is connected to the side wall 12 by a loop 16. The inner edge 16' of the loop 16 connected to an O-ring shaped based segment 14'. Within the O-ring shaped base segment 14' a circular shaped segment 14" is positioned (enclosed). The segment 14' is connected to the segment 14" by a further loop 90 that encloses the segment 14". This replaces the band 20 of the first baking pan 10 to better accommodate the shape of the base segments. As shown in FIG. 18, this loop 90 need not have flat surfaces. In this example the loop 90 has a wave shaped cross section.

Again, a different feet arrangement is provided unitary with the loops 16 and 90 as shown. Three elongated, slightly curved and equispaced feet 92 are provided with loop 16 as positions shown in FIG. 17. A further foot circular foot 94 is provided with loop 90 that surrounds the perimeter of base segment 14' as shown in FIG. 17.

Figure 21:
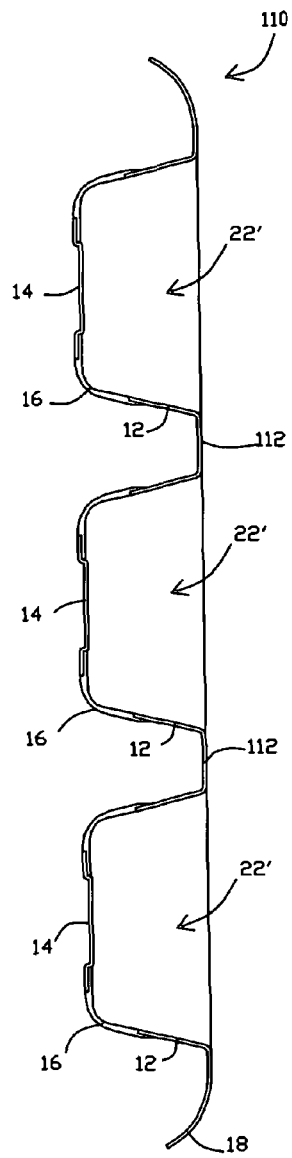
FIG. 21 is a simplified cross sectional view of the muffin baking pan along the line W" in FIG. 19.
Figure 19:
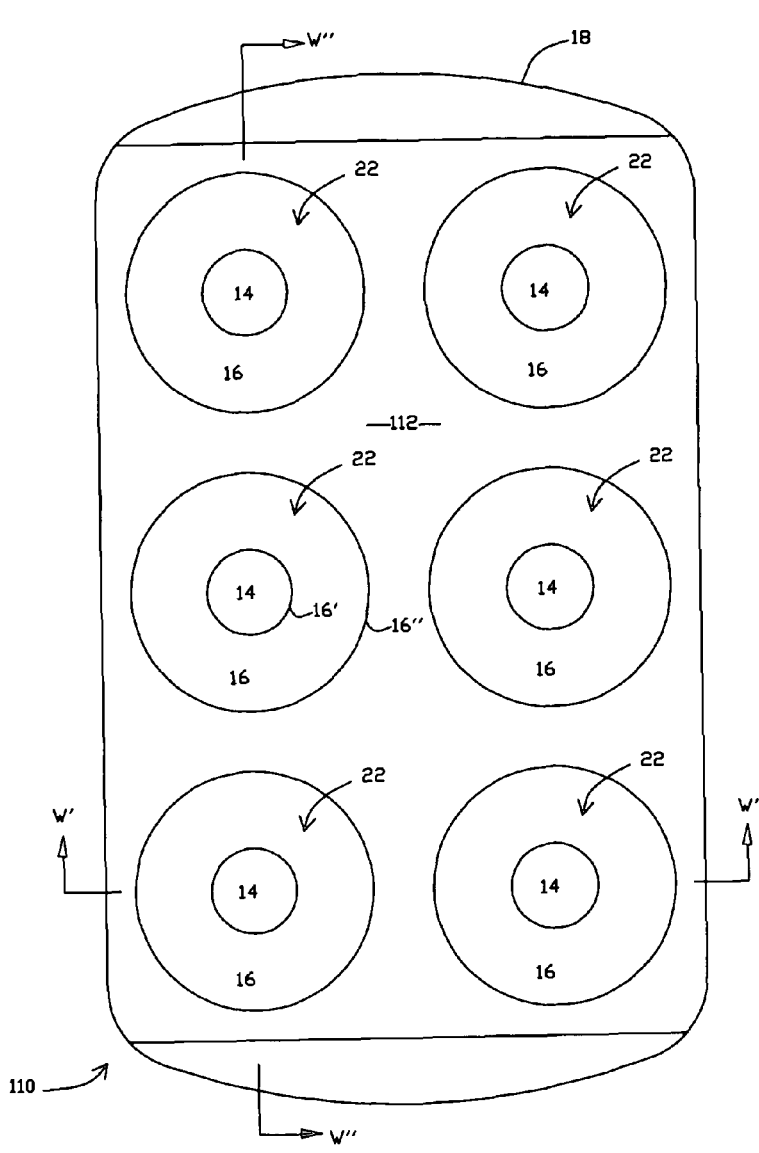
FIG. 19 is a simplified top view of a muffin baking pan.
Figure 20:
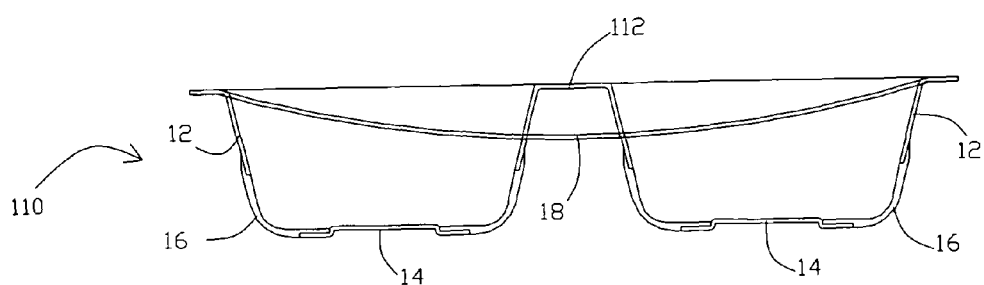
FIG. 20 is a simplified cross sectional view of the muffin baking pan along line W' in FIG. 19.

An example of a muffin baking pan 110 is shown in FIGS. 19, 20 and 21. In this example the muffin baking pan 110 provides six cavities 22' that can each accommodate the baking of a muffin. The base 14 of each cavity 22 is circular in shape and is connected to the side wall 12 of the cavity 22 by a loop 16. Each side wall 12 is connected by a top sheet of metal.

It will be appreciated by persons skilled in the art that numerous variations and/or modifications may be made to the invention as shown in the specific embodiments without departing from the spirit or scope of the invention as broadly described.

For example, two silicone bands may be provided that are substantially perpendicular to create a cross-like shape. Any suitable number of metal segments, including three or more, and any suitable shape of metal segments can be used. The surfaces of the metal and silicon need not be flat. The feet can be arranged in any suitable way. The baking pan could provide a cavity of many possible shapes and the silicone loop would simply form the same shape. Various modifications to the shape of the band, loop, side walls and base could be made to better assist the movements shown in FIGS. 5 to 7.

The present embodiments are, therefore, to be considered in all respects as illustrative and not restrictive.

The invention claimed is:

1. A baking pan for baking food comprised of a substantially metal base and a substantially metal side wall, wherein the base and wall are continuously connected by a flexible strap-like loop whereby a first edge of the loop is connected to the base and a second edge of the loop is continuously connected to the wall, wherein the base and the wall are distinct members with a nearest edge of the base in reference to the wall being spaced from the nearest edge of the wall.

2. A baking pan according to claim 1, wherein the side wall can move substantially vertically and substantially perpendicularly to the base.

3. A baking pan according to claim 2, wherein the side wall moves closer to the base.

4. A baking pan according to claim 1, wherein the side wall can move in a circular movement.

5. A baking pan according to claim 1, wherein the flexible loop is a unitary loop.

6. A baking pan according to claim 1, wherein the flexible loop is comprised of silicone.

7. A baking pan according to claim 1, wherein the loop connects with the base and/or side wall by overlapping with the base or side wall.

8. A baking pan according to claim 7, wherein the first edge of the loop where it overlaps the base is substantially parallel with the base and the second edge of the loop where it overlaps with the side wall is substantially parallel with the side wall.

9. A baking pan according to claim 8, wherein the first edge of the loop is attached to an edge of the base and the second edge of the loop is attached to a bottom edge of the wall.

10. A baking pan according to claim 1, wherein the cross section of the strap-like loop is curved.

11. A baking pan according to claim 1, wherein the base comprises a first and second metal segments that are connected by a strap-like band.

12. A baking pan according to claim 11, wherein a first edge of the band is connected to an edge of the first metal segment and a second edge of the band is connected to an edge of the second metal segment.

13. A baking pan according to claim 11, wherein both ends of the strap-like band are connected to the first edge of the loop.

14. A baking pan according to claim 11, wherein the loop and band are unitary.

15. A baking pan according to claim 11, wherein the strap-like band extends the width of the base.

16. A baking pan according to claim 1, where the base comprises a first and second metal segments that are connected by a further flexible strap-like loop wherein this further loop shares substantially the same center with the loop and encloses the first metal segment.

17. A baking pan according to claim 16, wherein the second segment encloses the further loop.

18. A baking pan according to claim 1, wherein the flexible loop is provided with a plurality of feet formations.

19. A baking pan comprised of multiple baking pans according to claim 1, that are connected together.

* * * * *